(12) United States Patent
Yoshinari et al.

(10) Patent No.: US 10,266,443 B2
(45) Date of Patent: Apr. 23, 2019

(54) DEVICE FOR MANUFACTURING SIO₂-TIO₂ BASED GLASS

(71) Applicant: NIKON CORPORATION, Tokyo (JP)

(72) Inventors: Toshio Yoshinari, Machida (JP); Tadahiko Saito, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 46 days.

(21) Appl. No.: 15/716,084

(22) Filed: Sep. 26, 2017

(65) Prior Publication Data

US 2018/0016176 A1    Jan. 18, 2018

Related U.S. Application Data

(60) Division of application No. 14/582,237, filed on Dec. 24, 2014, now Pat. No. 9,802,852, which is a
(Continued)

(30) Foreign Application Priority Data

Jun. 27, 2012    (JP) ................................. 2012-144149

(51) Int. Cl.
*C03B 19/14*    (2006.01)
*C03C 3/04*    (2006.01)
(Continued)

(52) U.S. Cl.
CPC .......... *C03B 19/1415* (2013.01); *C03B 11/00* (2013.01); *C03B 19/1453* (2013.01); *C03B 19/1469* (2013.01); *C03B 19/1476* (2013.01); *C03B 19/1492* (2013.01); *C03B 23/0013* (2013.01); *C03B 23/0496* (2013.01);
(Continued)

(58) Field of Classification Search
CPC ............ C03B 19/1415; C03B 19/1453; C03B 19/1469; C03B 19/1476; C03B 19/1492; C03B 11/00; C03B 23/0013; C03B 23/0496; C03B 32/005
See application file for complete search history.

(56) References Cited

U.S. PATENT DOCUMENTS 4,810,276 A    3/1989  Gilliland
6,018,964 A    2/2000  Yajima et al.
(Continued)

FOREIGN PATENT DOCUMENTS

CN    1569701 A    1/2005
EP    0861812 A1    9/1998
(Continued)

OTHER PUBLICATIONS

Notification of Reexamination dated Apr. 2, 2018 in corresponding Chinese Patent Application No. 201380034214.4, 11 pgs.
(Continued)

*Primary Examiner* — Queenie S Dehghan

(57) ABSTRACT

A device for manufacturing SiO₂—TiO₂ based glass by growing a glass ingot upon a target by a direct method. The device includes the target, comprising a thermal storage portion that accumulates heat by being preheated, and a heat insulating portion that suppresses conduction of heat from the thermal storage portion in a direction opposite to the glass ingot.

2 Claims, 8 Drawing Sheets

Related U.S. Application Data continuation of application No. PCT/JP2013/067678, filed on Jun. 27, 2013.

(51) Int. Cl.

| | | |
|---|---|---|
| *C03B 23/00* | (2006.01) | |
| *C03C 3/06* | (2006.01) | |
| *C03B 32/00* | (2006.01) | |
| *C03B 23/049* | (2006.01) | |
| *C03B 11/00* | (2006.01) | |

(52) U.S. Cl.
CPC .............. *C03B 32/005* (2013.01); *C03C 3/04* (2013.01); *C03C 3/06* (2013.01); *C03B 2201/12* (2013.01); *C03B 2201/42* (2013.01); *C03C 2201/12* (2013.01); *C03C 2201/42* (2013.01); *C03C 2203/44* (2013.01); *C03C 2203/52* (2013.01)

(56) References Cited

U.S. PATENT DOCUMENTS

| 6,094,940 | A | 8/2000 | Fujiwara et al. |
|---|---|---|---|
| 6,505,484 | B1 | 1/2003 | Fujiwara et al. |
| 9,284,213 | B2 | 3/2016 | Mundy et al. |
| 2002/0002843 | A1 | 1/2002 | Gotoh et al. |
| 2002/0018942 | A1 | 2/2002 | Brown et al. |
| 2002/0050152 | A1 | 5/2002 | Fujiwara et al. |
| 2004/0018361 | A1 | 1/2004 | Takahashi et al. |
| 2004/0250573 | A1 | 12/2004 | Hack et al. |
| 2005/0120752 | A1 | 6/2005 | Brown et al. |
| 2007/0096403 | A1 | 5/2007 | Shah et al. |
| 2007/0130995 | A1 | 6/2007 | Hawtof et al. |
| 2009/0324187 | A1 | 2/2009 | Boese et al. |
| 2010/0154474 | A1 | 6/2010 | Beall et al. |
| 2014/0106094 | A1 | 4/2014 | Mundy et al. |
| 2015/0183677 | A1 | 7/2015 | Yoshinari |

FOREIGN PATENT DOCUMENTS

| EP | 1160209 A2 | 12/2001 |
|---|---|---|
| JP | 10-279319 | 10/1998 |
| JP | 11-228146 | 8/1999 |
| JP | 2001-342026 | 12/2001 |
| JP | 2002-53330 | 2/2002 |
| JP | 2004-123508 | 4/2004 |
| JP | 2009-132550 | 6/2009 |
| WO | WO 2004/092082 A1 | 10/2004 |

OTHER PUBLICATIONS

Chinese Office Action dated Sep. 26, 2016 in Chinese Patent Application No. 201380034214.4.
PCT International Preliminary Report on Patentability and Written Opinion of the International Searching Authority dated Dec. 31, 2014 in International Patent Application No. PCT/JP2013/067678.
Chinese Office Action dated Mar. 2, 2016 in Chinese Patent Application no. 201380034214.4.
Extended European Search Report dated Jan. 28, 2016 in European Patent Application No. 13809320.8.
International Search Report dated Sep. 17, 2013 in international Patent Application No. PCT/JP2013/067678.
Office Action in U.S. Appl. No. 14/582,237 dated Sep. 29, 2015.
Office Action in U.S. Appl. No. 14/582,237 dated Jan. 21, 2016.
Office Action in U.S. Appl. No. 14/582,237 dated Jul. 15, 2016.
Office Action in U.S. Appl. No. 14/582,237 dated Aug. 30, 2016.
Office Action in U.S. Appl. No. 14/582,237 dated May 9, 2017.
Notice of Allowance in U.S. Appl. No. 14/582,237 dated Jun. 23, 2017.
Chinese Office Action dated Mar. 17, 2017 in corresponding Chinese Patent Application No. 201380034214.4.
U.S. Appl. No. 14/582,237, filed Dec. 24, 2014, Yoshinari et al., Nikon Corporation.

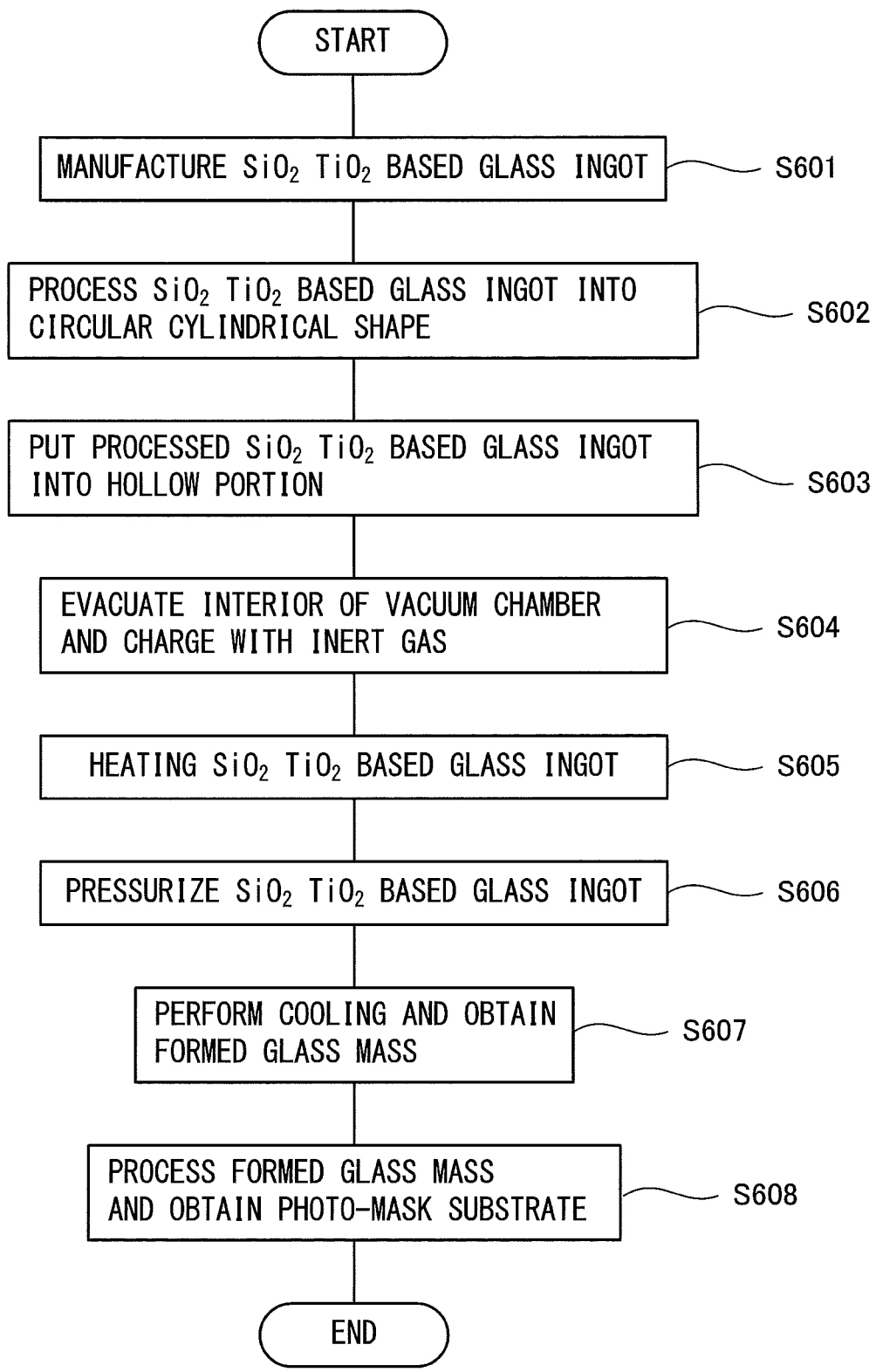

DEVICE FOR MANUFACTURING SiO$_2$-TiO$_2$ BASED GLASS

CROSS-REFERENCE TO RELATED APPLICATIONS

This is a divisional application filed under Rule 1.53(b) as U.S. application Ser. No. 14/582,237 filed Dec. 24, 2014 which is a continuation application filed under 35 U.S.C. § 111(a), which claims the benefit of PCT International Patent Application No. PCT/JP2013/067678, filed Jun. 27, 2013, which claims the foreign priority benefit under 35 U.S.C. § 119, of Japanese Patent Application No. 2012-144149, filed Jun. 27, 2012, the disclosures of which are herein incorporated by reference.

BACKGROUND

1. Field

The present invention relates to a manufacturing method for SiO$_2$—TiO$_2$ based glass, to a manufacturing method for a plate-shaped member made of SiO$_2$—TiO$_2$ based glass, to a manufacturing device, and to a manufacturing device for SiO$_2$—TiO$_2$ based glass.

2. Description of Related Art

In a photolithographic process, exposure processing is performed in which exposure light is irradiated upon a photo-mask, and a photosensitive substrate is exposed to the exposure light from the photo-mask. This type of photo-mask is obtained by forming a predetermined mask pattern upon a photo-mask substrate.

In recent years, the increase in size of photosensitive substrates has progressed remarkably, and, along with this, the size of photo-masks has also increased; for example, for an exposure device for liquid crystal panels from the eighth generation onward, a large-sized photo-mask is used in which one side is longer than 1.2 m. A photo-mask substrate that is used for a photo-mask having this type of large area can be manufactured by taking, as source material, an SiO$_2$ glass ingot that is formed as a circular cylinder that is produced by a vapor deposition method such as the direct method, and by press-molding this material so as to make a flat plate-shaped member (see Japanese Laid-Open Patent Publication 2002-53330).

SUMMARY

Now, the photo-mask absorbs part of the energy in the exposure light, and converts this absorbed energy into heat. As a result, the photo-mask is deformed by thermal expansion, and, since the absolute value of the amount of deformation is proportional to the size of the photo-mask if the coefficient of thermal expansion is constant, accordingly, the larger the size of the photo-mask is, the more prominently does the influence of thermal expansion appear.

Since this type of deformation of the photo-mask due to thermal expansion exerts an influence upon the accuracy of the patterning, accordingly investigations have been undertaken in relation to using glass whose thermal expansion ratio is low as a material for a photo-mask substrate; in concrete terms, the application of an SiO$_2$—TiO$_2$ based glass, that is per se known as a low thermal expansion glass, has been investigated.

The present invention provides a manufacturing method and a manufacturing device for an SiO$_2$—TiO$_2$ based glass that can be applied to manufacture of a large sized photo-mask substrate, and also to provide a manufacturing method for a plate-shaped member that is made of such a glass.

According to the first aspect of the present invention, a method for manufacturing an SiO$_2$—TiO$_2$ based glass upon a target by a direct method, comprises: a first process of preheating the target; and a second process of growing an SiO$_2$—TiO$_2$ based glass ingot to a predetermined length upon the target which has been preheated, wherein the target is heated in the first process such that, in the second process, the temperature of growing surface of the glass ingot is maintained at or above a predetermined lower limit temperature.

According to the second aspect of the present invention, the method for manufacturing an SiO$_2$—TiO$_2$ based glass according to the first aspect, it is preferred that, the thermal dose for heating the target is set so that the temperature of growing surface of the glass ingot is maintained at 1600° C. or higher.

According to the third aspect of the present invention, the method for manufacturing an SiO$_2$—TiO$_2$ based glass according to the first or second aspect, it is preferred that a condition for the second process to start is that, in the first process, the temperature of the target should have reached a predetermined temperature.

According to the fourth aspect of the present invention, the method for manufacturing an SiO$_2$—TiO$_2$ based glass according to any one of the first through third aspects, it is preferred that the target comprises a circular plate-shaped target member and an SiO$_2$ glass layer formed upon the target member.

According to the fifth aspect of the present invention, the method for manufacturing an SiO$_2$—TiO$_2$ based glass according to any one of the first through third aspects, it is preferred that the target includes a thermal storage portion that accumulates heat during the first process, and a heat insulating portion that suppresses conduction of heat from the thermal storage portion in the direction opposite to that of the glass ingot.

According to the sixth aspect of the present invention, the method for manufacturing an SiO$_2$—TiO$_2$ based glass according to the fifth aspect, it is preferred that the thermal storage portion and the heat insulating portion respectively comprise a plate-shaped first member and a plate-shaped second member; and the first member has a larger thermal capacity as compared with the second member, and the second member has a lower thermal conductivity as compared with the first member.

According to the seventh aspect of the present invention, the method for manufacturing an SiO$_2$—TiO$_2$ based glass according to the fifth aspect, it is preferred that the thermal storage portion comprises a plate-shaped first member, and has convex portions upon the surface of the first member that is opposite to the glass ingot.

According to the eighth aspect of the present invention, the method for manufacturing an SiO$_2$—TiO$_2$ based glass according to the seventh aspect, it is preferred that the heat insulating portion comprises a plate-shaped second member, and the first member and the second member are in mutual thermal contact via the convex portions.

According to the ninth aspect of the present invention, a method for manufacturing a plate-shaped member made of SiO$_2$—TiO$_2$ based glass, in which SiO$_2$—TiO$_2$ based glass is manufactured according to the manufacturing method of any one of Claims 1 through 8, and a plate-shaped member is manufactured by applying heat to and pressure molding that glass as a raw material.

According to the tenth aspect of the present invention, a manufacturing device for $SiO_2$—$TiO_2$ based glass by growing a glass ingot upon a target by a direct method, comprises the target comprises a thermal storage portion that accumulates heat by being preheated, and a heat insulating portion that suppresses conduction of heat from the thermal storage portion in the direction opposite to the glass ingot.

According to the eleventh aspect of the present invention, the manufacturing device for $SiO_2$—$TiO_2$ based glass according to the tenth aspect, it is preferred that the thermal storage portion and the heat insulating portion respectively comprise a plate-shaped first member and a plate-shaped second member; and the first member has a larger thermal capacity as compared with the second member, and moreover the second member has a lower thermal conductivity as compared with the first member.

According to the twelfth aspect of the present invention, the manufacturing device for $SiO_2$—$TiO_2$ based glass according to the tenth aspect, it is preferred that the thermal storage portion comprises a plate-shaped first member, and has convex portions upon the surface of the first member that is opposite to the glass ingot.

According to the thirteenth aspect of the present invention, the manufacturing device for $SiO_2$—$TiO_2$ based glass according to the twelfth aspect, it is preferred that the heat insulating portion comprises a plate-shaped second member, and the first member and the second member are in mutual thermal contact via the convex portions.

BRIEF DESCRIPTION OF DRAWINGS

These and/or other aspects and advantages will become apparent and more readily appreciated from the following description of the embodiments, taken in conjunction with the accompanying drawings of which:

FIG. 8 is a flow chart showing a manufacturing method for this plate-shaped member according to the fifth embodiment.

DESCRIPTION OF EMBODIMENTS

Embodiment #1

Figure 1:
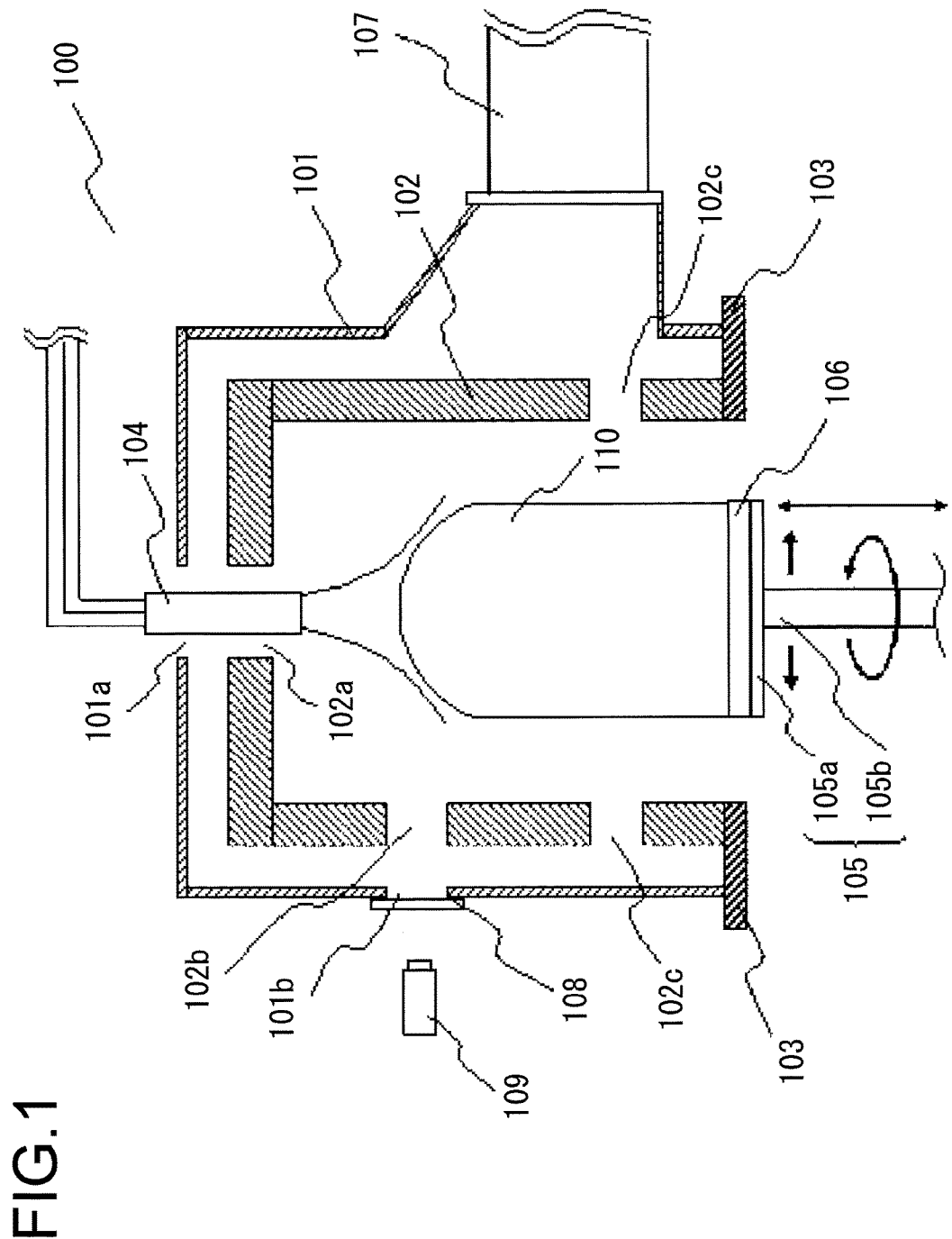
FIG. 1 is a structural diagram of a glass manufacturing device that is used in a manufacturing method for an $SiO_2$—$TiO_2$ based glass according to a first embodiment.

FIG. 1 is a structural diagram of a glass manufacturing device that is used for manufacturing an $SiO_2$—$TiO_2$ based glass according to this embodiment.

The manufacturing device 100 of FIG. 1 comprises an furnace frame 101, furnace walls 102 that are made of a fireproof material, an furnace floor 103 upon which the furnace frame 101 and the furnace walls 102 are disposed, a burner 104, a support member 105, and a target member 106.

The furnace wall 102 is disposed in the interior of the furnace frame 101. Through ports 101a and 102a for passing the burner 104 are provided in the upper portions of the furnace frame 101 and of the furnace wall 102 respectively. Moreover, viewing ports 101b and 102b for observing the growth surface of a glass ingot are provided in the side portions of the furnace frame 101 and of the furnace wall 102 respectively, and furthermore a transparent glass window 108 is provided in the viewing port 101b.

An radiation thermometer 109 is disposed at the exterior of the furnace frame 101, so as to be capable of measuring the temperature of the growth surface of the glass ingot through the viewing ports 101b and 102b.

Evacuate ports 102c are provided at the side portions of the furnace wall 102, so as to discharge chlorine gas that is generated as a by-product of the glass formation reaction, minute glass particles that have not been deposited upon the growth surface, and so on. Such chlorine gas and minute glass particles discharged from the evacuate ports 102c are conducted away by an evacuate conduit 107, and are collected by a scrubber not shown in the figures.

A target member 106 upon the upper surface of which the glass ingot is grown, and a support member 105 that supports the lower surface of the target member 106, are disposed in the interior of the manufacturing device 100. The support member 105 comprises a circular disk shaped portion and a rod shaped portion, and is built so that it can be rotated, tilted, and shifted up and down, as desired, by a drive device not shown in the figures that is connected to one end of the rod shaped portion. Moreover, the target member 106 is formed in the shape of a circular disk having approximately the same diameter as the circular disk shaped portion of the support member 105, and is disposed in a position to oppose the burner 104.

Figure 2:
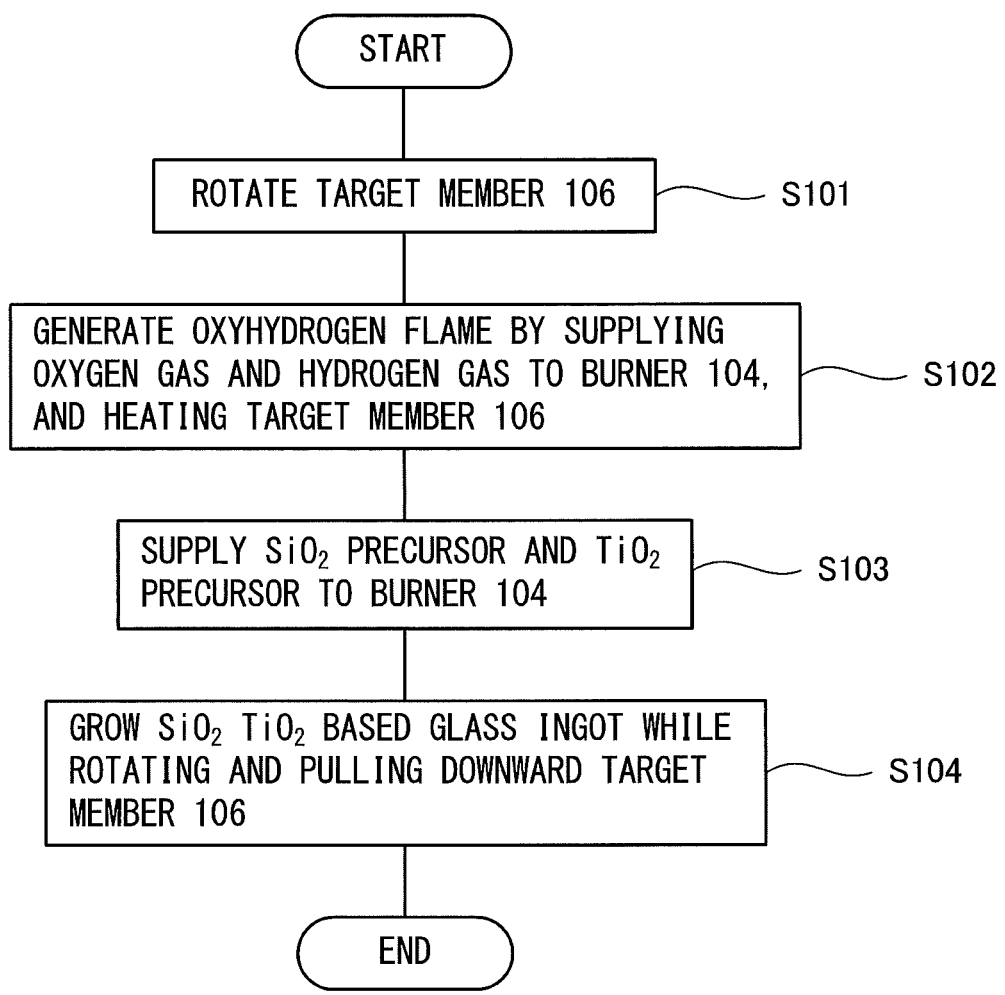
FIG. 2 is a flow chart showing this manufacturing method for an $SiO_2$—$TiO_2$ based glass according to the first embodiment.

The manufacture of an $SiO_2$—$TiO_2$ based glass according to this embodiment is performed according to the following procedure (refer to FIG. 2).

In the manufacturing method of this embodiment, first, the target member 106 is rotated at a predetermined speed via the support member 105 by a drive device not shown in the figures (S101). Next, oxygen gas and hydrogen gas are flowed to the burner 104 at predetermined rates, so that an oxyhydrogen flame is generated. And heat is applied with this hydrogen flame to the target member 106, while keeping the distance between the burner 104 and the target member 106 fixed (S102). In the following, this first process (S102) of applying heat to the target member 106 will be termed the "preheating process".

During the preheating process, the temperature of the target member 106 is monitored with the radiation thermometer 109, and, when this temperature reaches a temperature that is set in advance, supply of an $SiO_2$ precursor and supply of a $TiO_2$ precursor to the burner 104 are started simultaneously at flow rates that are both appropriately determined in advance, so that minute glass particles are created by the oxyhydrogen flame (S103).

Here, silicon tetrachloride ($SiCl_4$), silicon tetrafluoride ($SiF_4$), monosilane ($SiH_4$), or a gas including a silicon carbide compound such as octamethylcyclotetrasiloxane ($C_8H_{24}O_4Si_4$) or the like, may be used as the $SiO_2$ precursor. Moreover, a gas containing a titanium compound such as titanium tetrachloride (TiCl$_4$), tetraisopropoxytitanium (Ti(O-i-C$_3$H$_7$)$_4$), tetrakisdimethylaminotitanium (Ti[N(CH$_3$)$_2$]$_4$) or the like may be used as the TiO$_2$ precursor.

The precursors supplied to the burner 104 are hydrolyzed in the oxyhydrogen flame, so that minute glass particles are created. As the minute glass particles that are created deposit upon the target member 106, they are simultaneously melted and made into glass by the flame, so that an SiO$_2$—TiO$_2$ based glass is formed. Thereafter the minute glass particles continue to deposit, and the SiO$_2$—TiO$_2$ based glass ingot is grown until it reaches the desired length by pulling the target member 106 downward at a speed equal to the speed of deposition, while keeping the distance between the burner 104 and the glass growth surface (i.e. the deposition surface) fixed (S104). In the following, this second process of growing the ingot will be termed the "growing process".

When an SiO$_2$—TiO$_2$ based glass ingot is to be grown by the process described above, a sufficient amount of heat is accumulated in the target member 106 before starting to create the ingot. Due to this it becomes possible, during the growing process, to maintain the temperature of the growth surface at or above a predetermined lower limit temperature. As a result it becomes possible to manufacture a longer ingot as compared to the case with a prior art type manufacturing method, since the shape of the growth surface is maintained in a stable manner over a long time period. In other words, it becomes possible to manufacture a glass ingot of a greater mass, even though its diameter is the same. And it is possible to manufacture a photo-mask substrate of greater area from this glass ingot of greater mass.

In the manufacturing method according to the embodiment described above, before starting the growth of the glass ingot, heat is applied so as to bring the target to a predetermined temperature in advance. This preheating process in this embodiment will now be described in detail.

Normally, in a process of manufacturing glass by the direct method, since the temperature of the growth surface and the speed of generation of glass and so on change according to the amount of supply of glass raw material gases and combustion gas to the burner and so on, accordingly, in order to deposit glass of a constant composition at a constant speed in a stable manner, it is necessary to discover the optimum values by delicate adjustment of the balance of all these manufacturing parameters. Due to this it is simplest and easiest, for a person skilled in the art, when going about manufacture of an SiO$_2$—TiO$_2$ based glass in which TiO$_2$ is doped into an SiO$_2$ glass, as a fundamental manufacturing condition for SiO$_2$ glass in the prior art, to perform this manufacture by replacing a portion of the SiO$_2$ precursor supplied to the burner by the TiO$_2$ precursor, while keeping the other conditions the same as before.

Figure 3:
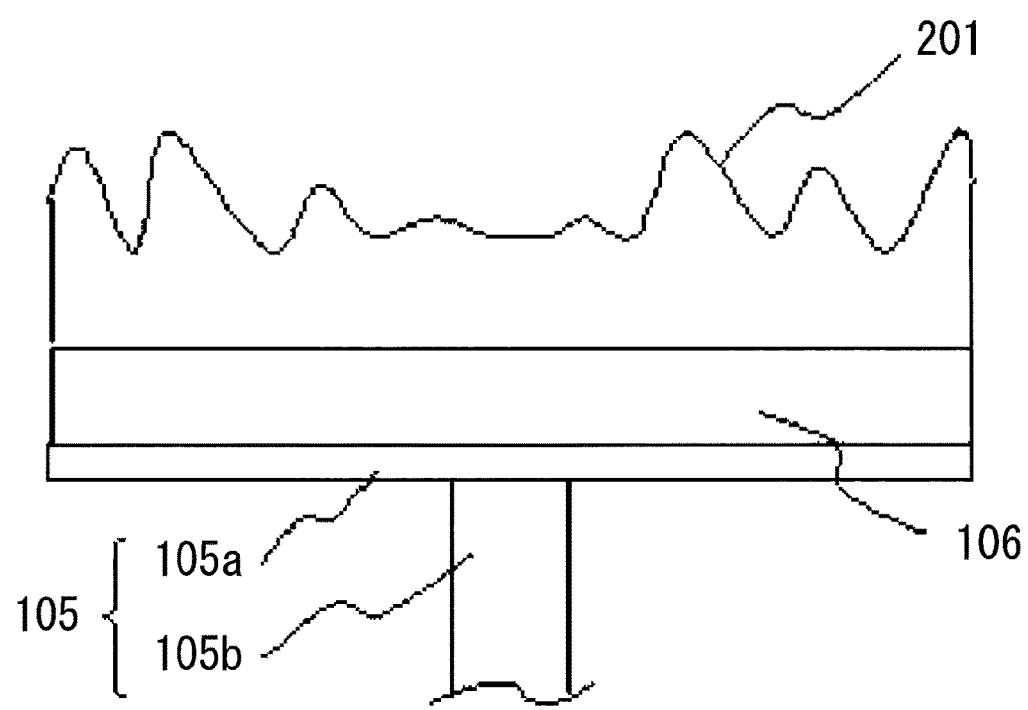
FIG. 3 is a sectional view of a glass ingot when convex portions are occurring at its growth surface.

However, according to research performed by the present inventors, if the prior art manufacturing conditions for an SiO$_2$ glass are kept the same without alteration, while only a portion of the SiO$_2$ precursor is replaced by the TiO$_2$ precursor, then a phenomenon occurs in which, soon after the start of growth of the ingot, local convex portions 201 appear at the growth surface, and the degree of concavo-convexity increases steadily due to these convex portion 201 growing preferentially over time. When the growth surface becomes extremely concavo-convex, it becomes impossible to make the ingot grow steadily any further, and accordingly it becomes impossible to manufacture a large sized ingot under manufacturing conditions of this sort (refer to FIG. 3).

Therefore the present inventors have performed various investigations in order to solve the problem described above, and, as a result, have clarified that the cause of the generation of the concave portions 201 described above is in the thermochemical properties of the TiO$_2$ precursor that is used as the glass raw material. In the reactions for creating an SiO$_2$—TiO$_2$ based glass, the hydrolysis reactions of the SiO$_2$ precursor and of the TiO$_2$ precursor are all reactions that generate heat. When the amounts of heat generated at this time per mole of both of these are compared together, it is seen that the amount of heat generated by the TiO$_2$ precursor is less than the amount of heat generated by the SiO$_2$ precursor. Now, the temperatures of the products when both of the precursors are hydrolyzed will be considered. Since, as described above, the amount of heat generated by the TiO$_2$ precursor is less than the amount of heat generated by the SiO$_2$ precursor, accordingly the temperature of the TiO$_2$ generated by hydrolysis is also lower than the temperature of the SiO$_2$. In other words, an amount of generated heat that is sufficient to maintain the shape of the growth surface is not obtained only by the hydrolysis reaction of the TiO$_2$ precursor. Accordingly, with only replacing a portion of the SiO$_2$ precursor with the TiO$_2$ precursor as in the conditions of manufacturing SiO$_2$ glass in the prior art, the amount of heat generated by the hydrolysis reaction of the TiO$_2$ precursor functions so as to reduce the temperature of the glass growth surface, and therefore the viscosity of the glass increases. Since fluidity of the growth surface is lost when the viscosity of the glass increases, the undesirable concavo-convexities typically occur in the shape of concentric circular wavy indentations upon the growth surface, and, due to increase of these concavo-convexities over time, it becomes impossible to grow the ingot in a stable manner for a long time period. Moreover, this phenomenon occurs when the temperature of the glass growth surface drops below a lower limit value.

However, with the manufacturing method of this embodiment, since in the preheating process heat is applied in advance to the target up to a predetermined temperature, and growth of the ingot is only started when a sufficient amount of heat has been accumulated in the target, accordingly, even if the amount of generated heat supplied by the TiO$_2$ precursor is relatively small, still the temperature of the glass growth surface does not drop below the lower limit temperature. Due to this, concavo-convexities do not occur upon the growth surface of the ingot, and, since this growth surface maintains its smooth shape in a stable manner over a long period of time, accordingly it is possible to grow the SiO$_2$—TiO$_2$ based glass ingot continuously over a long time period.

In this embodiment, the temperature at which heat is applied to the target in the preheating process is set so that the fluidity of the glass at the growth surface is not deteriorated, at least until an ingot of the desired length has grown, and so that the temperature is maintained at a level at which concavo-convexities do not occur upon the growth surface. While in concrete terms the temperature at which heat is applied to the target depends upon the thermal capacity of the target itself and the thermal transmission resistance to the object lying below and so on, nevertheless since, with the same manufacturing device, the higher the temperature of the target is when the preheating process ends, the longer is the time period over which it is possible to maintain the temperature of the growth surface, accordingly the temperature should be adjusted appropriately, according to the desired length for the ingot, in other words according to the desired growth time period for the ingot.

It should be understood that, when manufacturing an SiO$_2$—TiO$_2$ based glass by the direct method, the appropriate temperature for the growth surface is in the range from 1600° C. to 1800° C. If the temperature of the growth surface is 1600° C. or less, then the glass loses fluidity and concavo-convexities can easily occur; while, if that temperature is greater than 1800° C., then there is a tendency for the efficiency of deposition to drop due to vaporization of the glass becoming significant.

It should be understood that, in this embodiment, it is desirable for the thickness of the target to be 200 mm or greater. If the target is 200 mm or less, then it is not possible to accumulate a sufficient amount of heat when preheating the target, and the temperature of the growth surface when manufacturing the $SiO_2$—$TiO_2$ based glass has a tendency to become lower than 1600° C.

It should be understood that while, in the embodiment described above, in the preheating process, the thermal dose to the target was controlled on the basis of the temperature of the target, alternatively, if the combustion conditions of the burner and the gap between the burner and the target and so on are controlled to be constant, it would also be acceptable to perform control not on the basis of the temperature of the target, but upon the basis of the time period during which heat has been applied.

Embodiment #2

Figure 4:
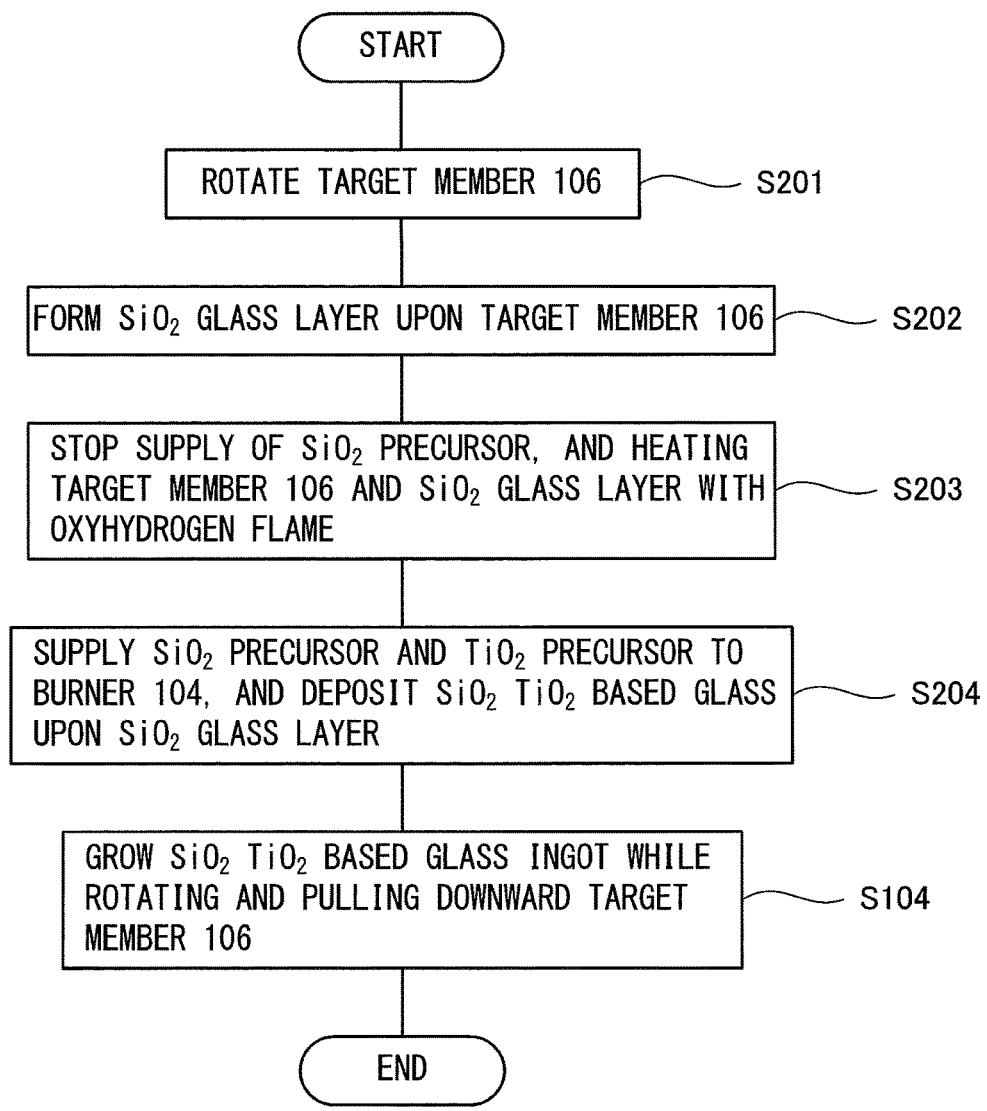
FIG. 4 is a flow chart showing a manufacturing method according to a second embodiment.

In the second embodiment, an $SiO_2$ glass layer is formed over the target member, and these are used as a combined target. A flow chart for this manufacturing process is shown in FIG. 4. It should be understood that the structure of the manufacturing device used in this embodiment is fundamentally the same as that of the device explained in connection with the first embodiment.

The manufacturing process of this embodiment is performed as follows. First the target member 106, that is supported via the support member 105, is rotated at a predetermined speed by a drive device not shown in the figures (S201), and next an oxyhydrogen flame is generated by flowing oxygen gas and hydrogen gas to the burner 104 at predetermined flow rates. And, furthermore, the $SiO_2$ precursor is flowed to the burner 104, and an $SiO_2$ glass layer is formed by depositing the minute glass particles that are generated upon the target member 106 (S202). At this time, it would also be acceptable for the target member 106 to be lowered at an appropriate speed to match the growth of the $SiO_2$ glass layer.

When an $SiO_2$ layer of a predetermined thickness has been formed upon the target member 106, the supply of $SiO_2$ precursor to the burner 104 is stopped, and heat is continuously applied with an oxyhydrogen flame (S203) to the target member 106 and to the $SiO_2$ glass layer that has been formed upon it. At this time, the temperature of the $SiO_2$ glass layer is measured with the radiation thermometer 109, and, when this reaches a predetermined temperature that is set in advance, the $SiO_2$ precursor and the $TiO_2$ precursor are both supplied simultaneously to the burner 104, so that an $SiO_2$—$TiO_2$ based glass is deposited upon the $SiO_2$ layer (S204). The subsequent processing is the same as in the case of the first embodiment (S104), and accordingly explanation thereof will be omitted.

In this embodiment, the target member 106 and the $SiO_2$ glass layer that is formed upon it function as the target. Accordingly, the steps S202 and S203 in which heat is applied to these members with an oxyhydrogen flame correspond to the preheating process, and the subsequent step S204 in which the $SiO_2$—$TiO_2$ based glass is deposited corresponds to the growing process.

Since, with the manufacturing method of this embodiment, both the target member and the $SiO_2$ glass layer that is formed upon it function as the target, accordingly the heat capacity of the target becomes greater as compared to the case in which only the target member is used, so that it becomes possible to maintain the temperature of the growth surface over a longer period of time.

It should be understood that while, in the embodiment described above, heat was applied continuously with an oxyhydrogen flame again after the formation of the $SiO_2$ glass layer was completed, it would also be acceptable, if at the time point that the formation of the $SiO_2$ glass has been completed the temperature of the target has arrived at the anticipated temperature, to transition immediately to the growing process and to start the growing of the $SiO_2$—$TiO_2$ based glass.

Moreover while, in the embodiment described above, the target member 106 and the $SiO_2$ glass layer were preheated with the oxyhydrogen flame after the $SiO_2$ glass layer has been formed upon the target member 106, it would also be acceptable to arrange to form the $SiO_2$ glass layer after having preheated the target member 106.

Embodiment #3

A variant embodiment of the target member explained in connection with the first and second embodiments will now be explained as a third embodiment of the present invention.

Figure 5:
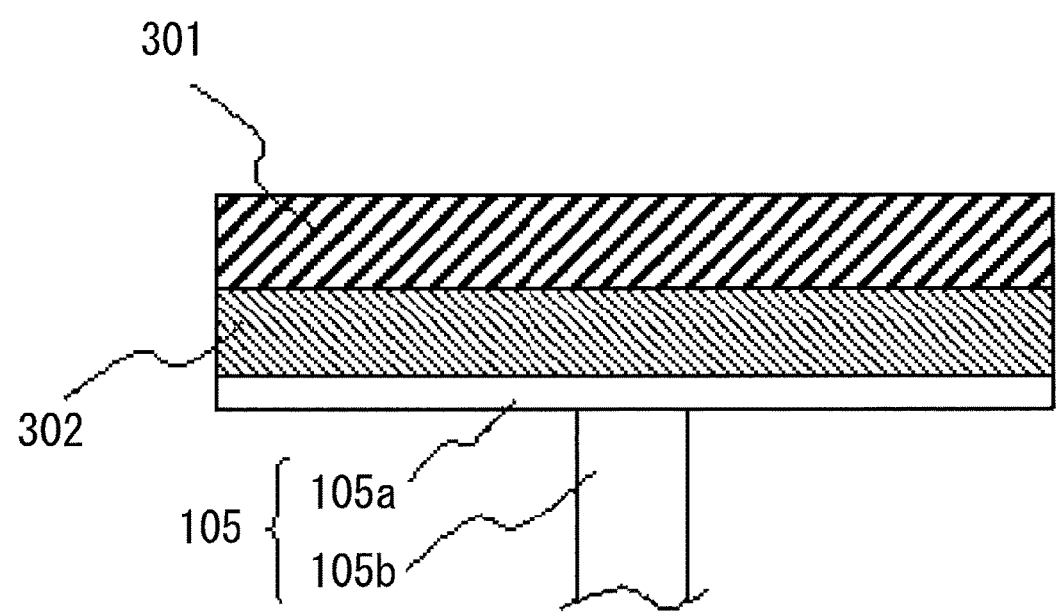
FIG. 5 is a sectional view showing a variant embodiment of a target member according to a third embodiment.

As shown in FIG. 5, the target member of this embodiment has a structure in which a first member 301 and a second member 302, both of which are shaped as circular plates, are laminated together in the thickness direction. Here, the first member 301 that is on the top is made of a material whose heat capacity per unit volume is relatively large, while the second member 302 that is below is made of a material whose heat conductivity is relatively low. In concrete terms, the first member 301 is made of a plate-shaped material whose specific heat is high and that has a high apparent density, such as a glass material or a ceramic material, for example quartz glass or sintered alumina or the like, while the second member 302 is made of a heat resistant fiber or a foamed fireproof material or the like whose apparent bulk density is low.

Among the portions from which the target member of this embodiment is constructed, the first member 301 functions as a thermal storage portion that accumulates a certain amount of heat due to the application of heat in the preheating process, while the second member 302 functions as a heat insulating portion that prevents the amount of heat accumulated in the first member 301 from being dissipated downward. Thus, when manufacturing an $SiO_2$—$TiO_2$ based glass using the target member of this embodiment, since it is possible to accumulate a greater amount of heat than during the previously described preheating processes, and since it is also possible to keep the amount of heat that has thus been accumulated over a longer time period, accordingly it becomes harder for the temperature of the growth surface to drop, and it becomes possible to grow the ingot in a stable manner for a longer period of time.

Embodiment #4

Figure 6:
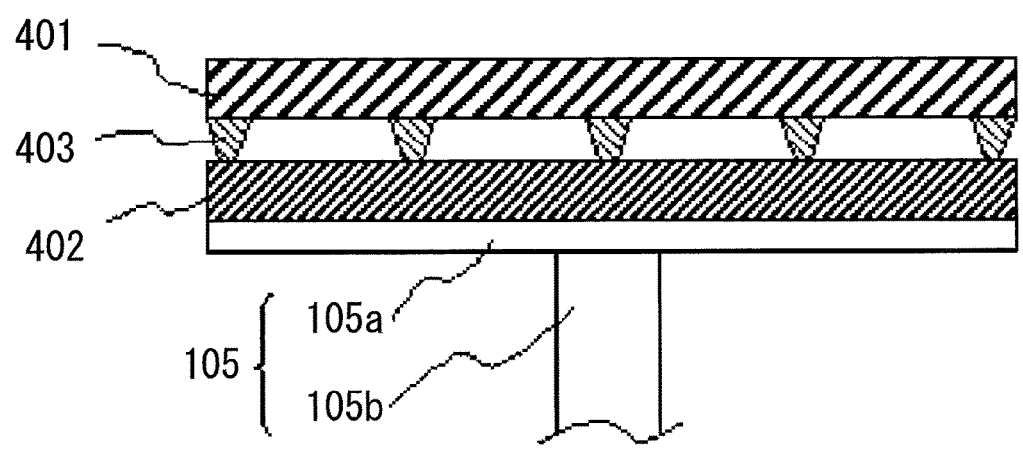
FIG. 6 is a sectional view showing a variant embodiment of a target member according to a fourth embodiment.

The fourth embodiment is another variant embodiment of the target member. As shown in FIG. 6, the target member of this embodiment has a construction in which a first member 401 and a second member 402, both of which are shaped as circular plates, are laminated together in the thickness direction. Since the materials of both the first member 401 and the second member 402 are the same as in the third embodiment described above, explanation thereof will be omitted.

The underside of the first member 401 of this embodiment is made with convex portions 403, and contacts against the second member at the ends of these convex portions. Due to this, the cross sectional area for heat transmission through which heat can flow from the first member toward the second member is greatly reduced, so that the convex portions on the first member themselves function as heat insulating sections. Moreover, since the second member against which the convex portions contact also is made of a heat insulating material, accordingly, overall, the target member of this embodiment is one that is excellent from the point of view of keeping heat, so that it is possible to grow the ingot in a stable manner over a long period of time, because it is more difficult for the temperature of the growth surface of the ingot to drop during the growing process.

It should be understood that while, in this embodiment, a structure has been explained in which the convex portions are provided upon the lower surface of the first member, it would also be acceptable for the convex portions to be provided upon the upper surface of the second member.

Embodiment #5

Next, as another aspect of the present invention, a method for manufacturing a plate-shaped glass member that can be used as a photo-mask substrate will be explained, in which an $SiO_2$—$TiO_2$ based glass ingot that has been manufactured according to one of the embodiments described above is employed as the raw material.

Among plate-shaped glass members, a member that is demanded to have extremely high purity with very few defects, of which a photo-mask substrate is representative, may be manufactured by forming a glass ingot that has been made by the vapor deposition method into the shape of a plate by heat application and pressurization.

Figure 7:
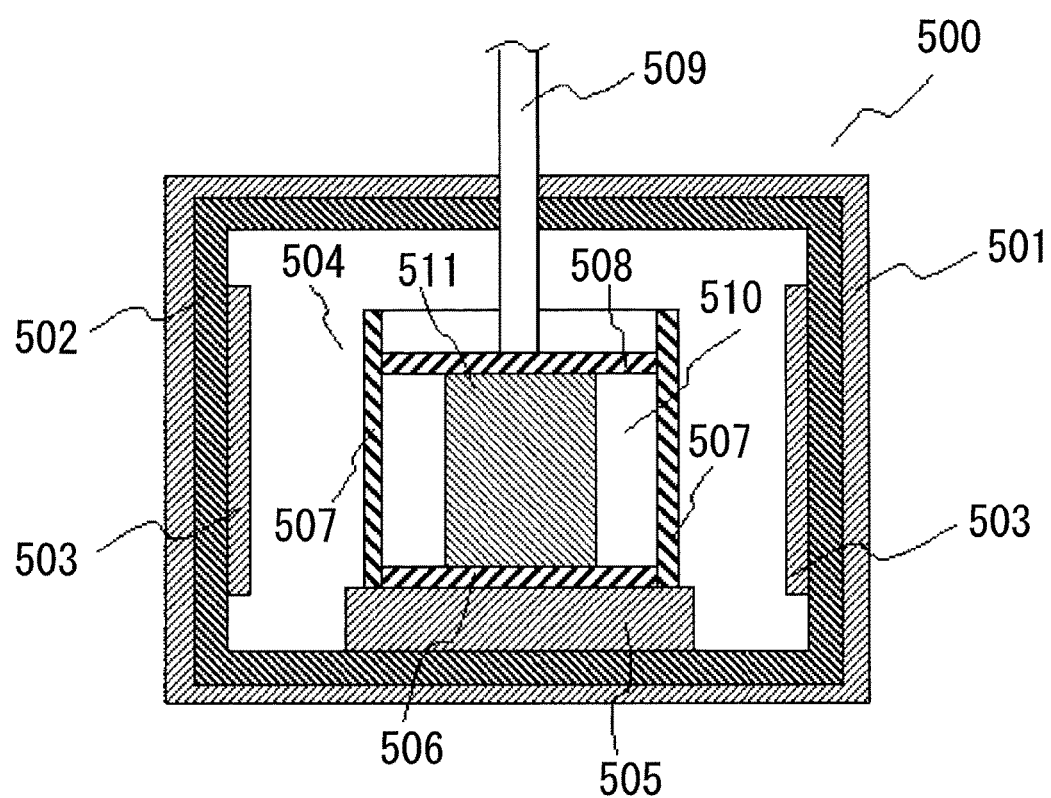
FIG. 7 is an example of the structure of a glass manufacturing device that is used in a manufacturing method for a plate-shaped member according to a fifth embodiment.

FIG. 7 shows an example of the structure of a glass molding device for manufacturing a plate-shaped glass member from a glass ingot. The glass molding device 500 shown in FIG. 7 comprises: a vacuum chamber 501 made of metal; a heat insulating member 502 that is provided along the entire surface of the inner wall of the vacuum chamber; carbon heaters 503 that are disposed on the side wall portions of the heat insulating member 502; a glass molding die 504 made of carbon that is disposed at the central portion of the vacuum chamber 501; and a cylinder rod 509 that is arranged to contact against the upper surface of the glass molding die 504.

The glass molding die 504 comprises a bottom portion comprising a base plate 505 and a bottom plate 506, side plates 507, and a top plate 508, with a hollow portion 510 of rectangular horizontal cross section being defined by the bottom plate 506, the side plates 507, and the top plate 508. By the top plate 508 being pressed by the cylinder rod 509, the top plate 508 can be shifted toward the bottom plate 506.

The process of manufacture of a plate-shaped member using the molding device 500 of FIG. 7 is shown in the flow chart of FIG. 8. First an $SiO_2$—$TiO_2$ based glass ingot is manufactured by an embodiment of the present invention (S601), and then a circular cylindrical piece of glass raw material is obtained (S602) by an appropriate process of trimming the up and lower end surfaces and the outer circumferential surface of this ingot. This glass raw material is put into the hollow portion 510 of the device 500 (S603), and inert gas is charged into the interior of the vacuum chamber 501, after it has been evacuated to vacuum (S604). The inert gas that is charged may be nitrogen gas, argon gas, helium gas, or the like.

Next, the glass molding die 504 and the glass ingot 511 are heated up to a predetermined temperature with the carbon heater 503 (S605). Here, the temperature up to which these elements are heated should be a temperature at which the ingot 511 can be deformed into the desired shape; in concrete terms, it may be set to a temperature that is greater than or equal to the crystallization temperature of the glass ingot 511, and to a temperature that is less than or equal to its softening point. Moreover, after the temperature of the glass ingot 511 has reached the predetermined temperature, the temperature of the glass ingot 511 may be kept at the predetermined temperature over a fixed time period, in order to make the internal temperature more uniform.

After the glass ingot 511 has been brought to the predetermined temperature, the top plate 508 is pressed by the cylinder rod 509 and is pushed downward toward the bottom plate 506, so that the glass ingot 511 is pressure formed until it reaches the desired thickness (S606), and then, after cooling, the glass member is extracted from the molding die 504, having been formed into a roughly rectangular and plate-shaped parallelepiped (S607).

By performing appropriate processing upon the member made of $SiO_2$—$TiO_2$ based glass manufactured in this manner, such as slicing processing and/or grinding processing in order to bring it to a predetermined size, beveling processing for radiusing its end surfaces, and grinding and polishing processing for smoothing its surfaces, it is transformed into a plate-shaped member that can be used for a photo-mask substrate (S608).

Since, according to the manufacturing method of this embodiment, the $SiO_2$—$TiO_2$ based glass raw material is formed into a large sized plate-shaped member, therefore it is possible to manufacture a plate-shaped member of much greater size than was possible in the prior art, so that, using this, it is possible to manufacture a photo-mask that has great area and moreover low thermal expansion. In more concrete terms, for example, it becomes possible to manufacture a photo-mask with which thermal expansion due to irradiation by the exposure light is suppressed, and that thus is a photo-mask that is suitable for making a liquid crystal panel of the eighth generation onward, for example a panel of which one side is greater than 1.2 m in length.

It should be understood that the first through the fifth embodiment explained above are only examples of embodiments of the present invention; it goes without saying that the present invention should not be considered as being limited only to those embodiments.

Practical Examples

An $SiO_2$—$TiO_2$ based glass was manufactured according to the manufacturing method of the first or the second embodiment. Oxygen gas was used as the oxidant gas ejected from the burner, and hydrogen gas was used as the flammable gas. Moreover, $SiCl_4$ gas was used as the $SiO_2$ precursor, while $TiCl_4$ gas was used as the $TiO_2$ precursor. Furthermore, the temperature within the glass manufacturing device during manufacture of the glass was measured with a thermocouple that was provided on an inner side wall surface of the glass manufacturing device. And the temperature of the growth surface of the glass was obtained by converting this temperature measured in the interior of the glass manufacturing device, using a predetermined calculation equation. This predetermined calculation equation is a proportional relationship that was obtained from temperatures of the growth surface and temperatures of the glass manufacturing device that were measured in advance.

Practical Example #1

As a target, a piece of SiO$_2$ glass 350 mm in diameter and 400 mm thick was prepared. An oxyhydrogen flame was generated by supplying oxygen gas at the proportion of 324 slm and hydrogen gas at the proportion of 795 slm from the burner, and heat was applied to the target with this oxyhydrogen flame for four hours. After four hours, SiCl$_4$ gas was supplied to the burner at the proportion of 40 g/min, and thereby a smooth growth surface made of SiO$_2$ glass was laid upon the upper surface of the target, in order to make it easy to manufacture a glass ingot. The temperature of the glass growth surface at this time was 1745° C. Next, the flow rate of the SiCl$_4$ gas was adjusted to 10 g/min, the flow rate of the oxygen gas was adjusted to 337 slm, and the flow rate of the hydrogen gas was adjusted to 825 slm, and TiCl$_4$ gas was supplied at the proportion of 0.2 g/min. The temperature of the growth surface 64 hours from the start of the supply of the TiCl$_4$ gas was 1750° C., and thereafter the glass ingot continued to grow. And, after a time period of 168 hours, the temperature of the growth surface was still kept at 1740° C., and it was possible to obtain an SiO$_2$—TiO$_2$ based glass ingot of diameter 300 mm and length 300 mm.

Practical Example #2

As a target, a piece of SiO$_2$ glass 350 mm in diameter and 15 mm thick was prepared. An oxyhydrogen flame was generated by supplying oxygen gas at the proportion of 306 slm and hydrogen gas at the proportion of 755 slm from the burner, and heat was applied to the target with this oxyhydrogen flame for four hours. After four hours, SiCl$_4$ gas was supplied to the burner at the proportion of 40 g/min, and thereby an SiO$_2$ glass layer of thickness 200 mm was manufactured upon the upper surface of the target, so as to form a glass growth surface. The temperature of the glass growth surface at this time was 1700° C. Next, the flow rate of the SiCl$_4$ gas was adjusted to 10 g/min, the flow rate of the oxygen gas was adjusted to 310 slm, and the flow rate of the hydrogen gas was adjusted to 770 slm, and TiCl$_4$ gas was supplied at the proportion of 0.2 g/min.

The temperature of the growth surface 70 hours from the start of the supply of the TiCl$_4$ gas was 1730° C., and thereafter the glass ingot continued to grow. And, after a time period of 185 hours, the temperature of the growth surface was still kept at 1730° C., and it was possible to obtain an SiO$_2$—TiO$_2$ based glass ingot of diameter 300 mm and length 300 mm.

Comparative Example #1

As a target, a piece of SiO$_2$ glass 350 mm in diameter and 30 mm thick was prepared. An oxyhydrogen flame was generated by supplying oxygen gas at the proportion of 321 slm and hydrogen gas at the proportion of 790 slm from the burner, and heat was applied to the target with this oxyhydrogen flame for four hours. After four hours, SiCl$_4$ gas was supplied to the burner at the proportion of 40 g/min, and thereby a smooth growth surface made of SiO$_2$ glass was manufactured upon the upper surface of the target, so as to make it easy to form a glass ingot. The temperature of the glass growth surface at this time was 1550° C. Next, the flow rate of the SiCl$_4$ gas was adjusted to 30 g/min, the flow rate of the oxygen gas was adjusted to 347 slm, and the flow rate of the hydrogen gas was adjusted to 850 slm, and TiCl$_4$ gas was supplied at the proportion of 0.2 g/min.

And, after a time period of 5 hours from the start of the supply of the TiCl$_4$ gas, the temperature of the growth surface was 1570° C. Thereafter, while the ejection of the raw material gases, of the oxygen gas, and of the hydrogen gas from the burner still continued, after 18 hours the temperature of the growth surface was 1590° C., and this was below the temperature of 1600° C. at which it was possible to make the glass ingot grow in a stable manner. And after 20 hours concavo-convexities appeared upon the growth surface as wavy indentations in the form of concentric circles, and thereafter it became impossible to grow the glass ingot in a steady manner.

Comparative Example #2

As a target, a piece of SiO$_2$ glass 350 mm in diameter and 30 mm thick was prepared. An oxyhydrogen flame was generated by supplying oxygen gas at the proportion of 340 slm and hydrogen gas at the proportion of 835 slm from the burner, and heat was applied to the target with this oxyhydrogen flame for four hours. After four hours, SiCl$_4$ gas was supplied to the burner at the proportion of 40 g/min, and thereby a smooth growth surface made of SiO$_2$ glass was manufactured upon the upper surface of the target, so as to make it easy to form a glass ingot. The temperature of the glass growth surface at this time was 1570° C. Next, the flow rate of the SiCl$_4$ gas was adjusted to 30 g/min, the flow rate of the oxygen gas was adjusted to 404 slm, and the flow rate of the hydrogen gas was adjusted to 985 slm, and TiCl$_4$ gas was supplied at the proportion of 0.4 g/min.

However, after a time period of 5 hours from the start of the supply of the TiCl$_4$ gas, concavo-convexities appeared upon the growth surface as wavy indentations in the form of concentric circles, and thereafter it became impossible to grow the glass ingot in a steady manner. At this time, the temperature of the growth surface was 1570° C., and this was below the temperature of 1600° C. at which it was possible to make the glass ingot grow in a stable manner.

Various embodiments and variations have been explained above. However, the present invention is not limited thereto.

What is claimed is:

1. A device for manufacturing SiO$_2$—TiO$_2$ based glass by growing a glass ingot upon a target by a direct method, comprising:
   the target, comprising
   a thermal storage portion that accumulates heat by being preheated, and
   a heat insulating portion that suppresses conduction of heat from the thermal storage portion in the direction opposite to the glass ingot,
   wherein the thermal storage portion comprises a plate-shaped first member, and has convex portions upon a surface of the first member that is opposite to the glass ingot.

2. The device according to claim 1, wherein:
   the heat insulating portion comprises a plate-shaped second member, and the first member and the second member are in mutual thermal contact via the convex portions.

* * * * *